United States Patent
Dufford (10) Patent No.: US 9,909,516 B2
(45) Date of Patent: Mar. 6, 2018

(54) SYSTEM AND METHOD FOR ACCELERATION EVENT PREDICTION

(71) Applicant: Toyota Motor Engineering & Manufacturing North America, Inc., Erlanger, KY (US)

(72) Inventor: Mohammad E. Dufford, Los Angeles, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/473,432

(22) Filed: Mar. 29, 2017

(65) Prior Publication Data

US 2017/0218862 A1    Aug. 3, 2017

Related U.S. Application Data

(63) Continuation of application No. 15/015,056, filed on Feb. 3, 2016, now Pat. No. 9,630,611.

(51) Int. Cl.
   *B60W 10/06*         (2006.01)
   *F02D 41/00*         (2006.01)
   (Continued)

(52) U.S. Cl.
   CPC ...... *F02D 41/0007* (2013.01); *B60K 31/0058* (2013.01); *G01C 21/3415* (2013.01); *G01C 21/362* (2013.01); *G05D 1/0088* (2013.01)

(58) Field of Classification Search
   CPC .................................................. B60K 31/0058
   See application file for complete search history.

(56) References Cited

U.S. PATENT DOCUMENTS 6,134,888 A    10/2000   Zimmer et al.
6,938,420 B2    9/2005   Kawamura et al.
(Continued)

FOREIGN PATENT DOCUMENTS

WO   WO 2014/140529    9/2014
WO   WO 2015/097438    7/2015

OTHER PUBLICATIONS

Richard Truett et al., *Electric Turbocharger Eliminates Lag*; Automotive News, Aug. 3, 2014, 2 pages.

*Primary Examiner* — Alex C Dunn
(74) *Attorney, Agent, or Firm* — Snell & Wilmer LLP (57) ABSTRACT

Methods, systems, and apparatus for acceleration event prediction. A system includes one or more external databases connected through a network to a vehicle. The vehicle includes a navigation unit, one or more sensors and an electronic control unit coupled to at least the navigation unit and the one or more sensors. The electronic control unit is configured to obtain navigational map information and vehicle information, determine a predicted route set including a destination location based on the the navigational map information and the vehicle information, determine one or more predicted acceleration events for the predicted route set, detect a respective acceleration event of the one or more predicted acceleration events based on the predicted route set and a first location of the vehicle and send or transmit a signal to a turbocharger that is coupled to an engine to prepare for the respective acceleration event.

20 Claims, 7 Drawing Sheets

(51) Int. Cl.
  *G01C 21/36*   (2006.01)
  *G01C 21/34*   (2006.01)
  *G05D 1/00*    (2006.01)
  *B60K 31/00*   (2006.01)

(56) References Cited

U.S. PATENT DOCUMENTS

| | | |
|---|---|---|
| 7,076,954 B1 | 7/2006 | Sopko, Jr. et al. |
| 7,328,577 B2 | 2/2008 | Stewart et al. |
| 7,793,500 B2 | 9/2010 | Igarashi |
| 8,439,796 B2 | 5/2013 | Doering et al. |
| 8,583,351 B2 | 11/2013 | Uhrich et al. |
| 8,919,120 B2 | 12/2014 | Robinson |
| 9,091,219 B2 | 7/2015 | Kar et al. |
| 2009/0164096 A1 | 6/2009 | Graf et al. |
| 2010/0300088 A1 | 12/2010 | Joergl et al. |
| 2014/0026545 A1* | 1/2014 | Mori ............... F01N 3/2033 60/286 |
| 2014/0053804 A1* | 2/2014 | Rayl ............... F02D 41/0087 123/350 |
| 2014/0200763 A1* | 7/2014 | Sisk ............... B60W 10/24 701/36 |
| 2015/0361907 A1* | 12/2015 | Hayman ........... F02D 41/0087 123/198 F |
| 2016/0082964 A1* | 3/2016 | Chunodkar ......... B60W 30/18 701/70 |
| 2016/0349751 A1* | 12/2016 | Sugimoto ............ G01C 21/36 |

\* cited by examiner

SYSTEM AND METHOD FOR ACCELERATION EVENT PREDICTION

CROSS REFERENCE TO RELATED APPLICATION

This application is a continuation of U.S. application Ser. No. 15/015,056 entitled "System and Method for Acceleration Event Prediction," filed on Feb. 3, 2016, now U.S. Pat. No. 9,630,611, which is hereby incorporated by reference herein in its entirety.

BACKGROUND

Field

This specification relates to acceleration event prediction for vehicles.

Description of the Related Art

Vehicle carmakers reduce engine size to reduce vehicle fuel consumption in vehicles. The reduced engine size provides better fuel economy but generally provides reduced performance. In order to maintain or increase the performance of the vehicle, vehicle designers and manufacturers utilize an exhaust-driven turbocharger coupled to the engine. The exhaust-driven turbocharger, however, comes with a delayed boost or power response, otherwise known as a turbo lag. The turbo lag increases the acceleration time of the vehicle and creates the delayed response felt by drivers of the vehicle.

Accordingly, there is a need for a system and method of reducing the turbo lag and the delayed response felt by drivers of the vehicle.

SUMMARY

In general, one aspect of the subject matter described in this specification may be embodied in a system for acceleration event prediction for a vehicle that includes one or more external databases connected through a network to a vehicle. The vehicle may include a navigation unit, one or more sensors and an electronic control unit coupled to at least the navigation unit and the one or more sensors. The electronic control unit may be configured to obtain, from the one or more external databases and the navigation unit, navigational map information and vehicle information, determine a predicted route set including a destination location based on the navigational map information and the vehicle information, determine one or more predicted acceleration events for the predicted route set, detect a respective acceleration event of the one or more predicted acceleration events based on the predicted route set and a first location of the vehicle, and transmit a signal to a turbocharger coupled to an engine to prepare for the respective acceleration event.

These and other embodiments may optionally include one or more of the following features. The electronic control unit may be configured to receive, from the one or more sensors, sensor information that indicates no hazards are within a threshold distance of the vehicle. The signal may be based on the sensor information. The vehicle may further include a user interface coupled to the electronic control unit and having one or more user interface elements, each of the one or more user interface elements corresponding to at least one of the one or more predicted acceleration events. The electronic control unit may further be configured to receive, from the user interface, a selection of at least one of the one or more user interface elements and remove at least one of the one or more predicted acceleration events that correspond to the at least one of the selected one or more user interface elements. A user interface may be coupled to the vehicle through the network. The user interface may be a personal device. Information from the personal device may be used to determine the predicted route set. The predicted route set may be based on a driver's driving patterns. The electronic control unit may be configured to store, in an internal database, a route history that includes an identity of a driver, the predicted route set, time and date information, and driving patterns of drivers.

In another aspect, the subject matter may be embodied in a method for acceleration event prediction of a vehicle by an electronic control unit that includes obtaining, from a navigation unit, navigational map information and vehicle information, determining, by the electronic control unit, a predicted route set including a destination location based on the navigational map information and the vehicle information, determining, by the electronic control unit, one or more predicted acceleration events for the predicted route set, detecting, by the electronic control unit, a respective acceleration event of the one or more predicted acceleration events based on the predicted route set and a first location of the vehicle and transmitting a first signal to a turbocharger to prepare for the respective acceleration event. In another aspect, the subject matter may be embodied in a system for acceleration event prediction for an autonomous vehicle that includes one or more external databases connected through a network to a vehicle The vehicle may include an engine, a turbocharger coupled to the engine, a navigation unit, one or more sensors and an electronic control unit that is coupled to at least the navigation unit and the one or more sensors. The electronic control unit is configured to determine, using the one or more sensors, that the turbocharger of the engine is spooled using the one or more sensors to measure pressure within the turbocharger, obtain, from the navigation unit, vehicle information including a current location of the vehicle, determine that there is a mis-activation event based on a predicted route set, a respective acceleration event of one or more predicted acceleration events, a current time, and the current location of the vehicle and transmit, to the turbocharger, a signal to spool down the turbocharger.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for determining and implementing predicted acceleration events. Particular embodiments of the subject matter described in this specification may be implemented to realize one or more of the following advantages. Acceleration events may be anticipated to spool the turbocharger in preparation of the acceleration event. By anticipating acceleration events, the responsiveness of the vehicle, during acceleration, increases and the delayed response or lag associated with accelerating a vehicle is reduced or eliminated. This increased responsiveness may provide better acceleration and handling of the vehicle for various different road conditions and terrains. Other benefits and advantages include the ability to predict routes that are customized based on the identity of the driver, terrain, traffic and road conditions, and other factors to customize the driving experience. The adaptability may also provide for a more comfortable and consistent ride for the driver and the occupants.

Figure 1:
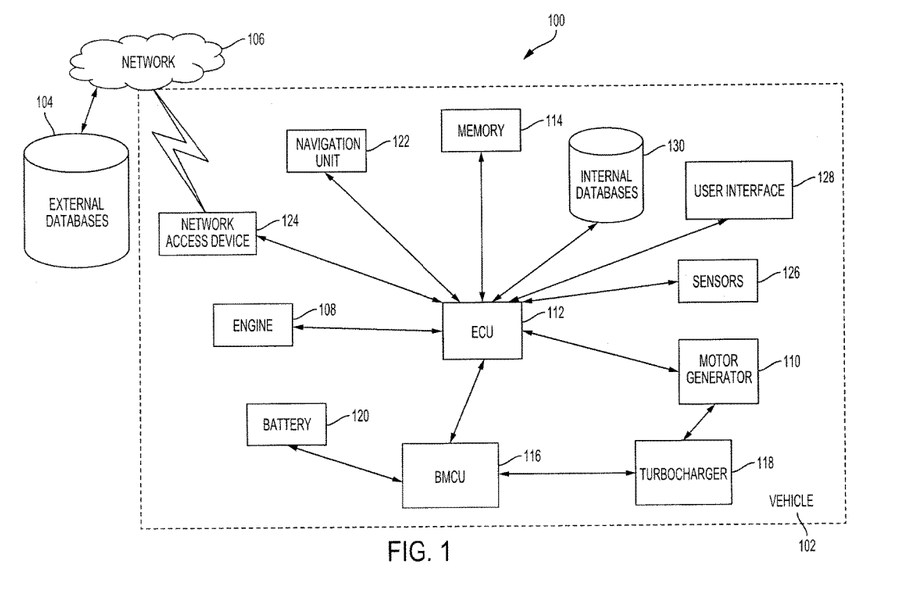
FIG. 1 is a block diagram of an acceleration event prediction system that predicts an approaching acceleration event and spools a turbocharger of a vehicle in preparation for an approaching acceleration event.

FIG. 1 is a block diagram of an acceleration event prediction system 100 that predicts an approaching acceleration event and spools a turbocharger 118 of a vehicle 102 in preparation for the approaching acceleration event. The acceleration event prediction system 100 may include one or more computers or electronic control units, appropriately programmed, to perform acceleration event prediction.

The acceleration event prediction system 100 includes a vehicle 102 that is coupled to a network 106 and one or more external databases 104. A vehicle, e.g., vehicle 102, is a conveyance capable of transporting a person or persons or any material or any permanently or temporarily affixed apparatus. A vehicle may be a self-propelled wheeled conveyance, such as a car, truck, bus, van or other motor and/or battery driven vehicle. For example, the vehicle 102 may be an electric vehicle, a hybrid vehicle, a plug-in hybrid vehicle or any other type of vehicle that includes a battery 120 and/or a motor/generator 110. Other examples of vehicles include bicycles, trains, planes, or boats, and any other form of conveyance that is capable of transportation. A vehicle, e.g., vehicle 102, may be a semi-autonomous or an autonomous vehicle. That is, the vehicle 102 may be self-maneuvering and capable of sensing the environment and navigating without human input. An autonomous vehicle may use one or more sensors, e.g., the one or more sensors 126, and a navigation unit, e.g., the navigation unit 122, to drive autonomously.

The vehicle 102 may be coupled to a network 106. The network 106, such as a local area network (LAN), a wide area network (WAN), a cellular network, the Internet, or a combination thereof, connects the vehicle 102 to the one or more external databases 104. The external databases 104 may include many databases from different service providers. A service provider may provide information to the vehicle 102.

Information provided by the service providers may include navigational map information, traffic condition information, or other information. The information may be stored in the one or more databases, e.g., external databases 104 or internal databases 130.

A database is any collection of pieces of information that is organized for search and retrieval, such as by a computer, and the database may be organized in tables, queries, schemas, queries, report, or any other data structures. A database may use any number of database management systems. An external database 104 may include a third-party server or website that stores or provides information. The information may be real-time information, updated periodically, or user-inputted. A server may be a computer in a network that is used to provide services, such as accessing files or sharing peripherals, to other computers in the network. A website may be a collection of one or more resources associated with a domain name.

Navigational map information may include terrain information and political information. Terrain information includes locations of physical geographic features such as hills, mountains, rivers and forests. Terrain information may also include elevation or topographical information that may identify terrain features, e.g., hills, mountains, and water bodies. Political information includes political features such as cities, states, roads, highways, on-ramps, off-ramps, bridges, and toll roads. Political information may also include information related to zoning ordinances, laws and regulations, the location of emergency vehicles and other public utility vehicles, and traffic signs or signals. For example, laws and regulations may include the regulated speed on different portions of a road. The navigational map information may also include other features, e.g., buildings, places, or other structures, stadiums, tourist attractions, mass transportation hubs, schools, and neighborhoods, and information associated with the other features.

Features, e.g., terrain features, political features, or other features, each have a location that may be identified by map coordinates. The navigational map information may include the map coordinates associated with the features. Map coordinates include latitude and longitudinal coordinates.

Traffic condition information includes one or more traffic condition features. The traffic condition features may include traffic congested areas, construction areas, or accident areas. The traffic condition information may include information related to the density and movement of vehicles on a roadway such as a road, highway, tunnel, or bridge, construction information, accident information, or information about vehicles in public/private structures that typically have congestion during specific hours or after specific events. The one or more traffic condition features each may have a location associated with the respective traffic condition feature. Map coordinates may identify the traffic condition features.

The vehicle 102 includes features that allow it to learn the driver's routes over time such that future routes may be predicted. The vehicle 102 may include an engine 108, a motor/generator 110, an electronic control unit (ECU) 112, a memory 114, a battery management and control unit (BMCU) 116, an internal database 130, a turbocharger 118 and a battery 120. The vehicle 102 may also include a navigation unit 122, a network access device 124, one or more sensors 126 and a user interface 128.

The motor/generator 110 may convert electrical energy into mechanical power, such as torque, and may convert mechanical power into electrical energy. The motor/generator 110 may be coupled to the battery 120. The motor/generator 110 may convert the energy from the battery 120 into mechanical power, and may provide energy back to the battery 120, for example, via regenerative braking. In some implementations, the vehicle 102 may include one or more additional power generation devices such as the engine 108 or a fuel cell stack (not shown). The engine 108 combusts fuel to provide power instead of and/or in addition to the power supplied by the motor/generator 110.

The battery 120 may be coupled to the motor/generator 110 and may provide electrical energy to and receive electrical energy from the motor/generator 110. The battery 120 may include one or more rechargeable batteries.

The BMCU 116 may be coupled to the battery 120, and may control and manage the charging and discharging of the battery 120. The BMCU 116, for example, may measure, using battery sensors (not shown), parameters used to determine the state of charge (SOC) of the battery 120.

The ECU 112 may be electrically coupled to some or all of the components of the vehicle 102. The ECU 112 may include one or more processors or controllers specifically designed for automotive systems, and the functions of the ECU 112 may be implemented in a single ECU or in multiple ECUs. The ECU 112 may receive data from one or more components and control the operation of one or more components based on the received or determined data. For example, the ECU 112 may receive data from a navigation unit 122, one or more sensors 126, and a network access device 124 and integrate the data received from each of the devices to output a display on a user interface 128. The ECU 112 may also control the operations of the BMCU 116 to charge or discharge the battery 120. The ECU 112 may also control operations of the turbocharger 118 to spool-up or spool-down the turbocharger 118. The turbocharger 118 may be an electric turbocharger.

The memory 114 may be coupled to the ECU 112. The memory 114 may store instructions to execute on the ECU 112 and may include one or more of a RAM or other volatile or non-volatile memory. The memory 114 may be a non-transitory memory or a data storage device, such as a hard disk drive, a solid-state disk drive, a hybrid disk drive, or other appropriate data storage, and may further store machine-readable instructions, which may be loaded and executed by the ECU 112.

The ECU 112 may be coupled to one or more sensors 126 that detect various internal or external environmental parameters. Internal sensors may include units and/or devices of the vehicle 102, such as a vehicle speed sensor, a battery temperature sensor, a grade detection sensor, or an inertial measurement unit (IMU). External sensors may include units and/or devices of the vehicle, such as a proximity detector or road condition sensor.

The navigation unit 122 may include a GPS unit (not shown) for detecting location data and date/time information. The navigation unit 122 may provide navigation instructions based on detected location data and may include a memory (not shown) for storing route data and/or store the route data in an internal database 130. The navigation unit 122 may also include or receive data from other sensors capable of detecting data corresponding to location information. For example, the other sensors may include a gyroscope or an accelerometer.

In some implementations, the navigation unit 122 also includes a processor for predicting a route or a route set based on location data detected by the GPS, a current day of the week, a current date, a current time and/or other factors. In other implementations, the ECU 112 may predict a route set that includes at least two predicted routes.

The navigation unit 122 may be integral to the vehicle 102 or a separate unit coupled to the vehicle 102, or may be separate from the vehicle 102, such as a personal device with navigation capability. When the navigation unit 122 is separate from the vehicle 102, the navigation unit 122 may communicate with the vehicle 102 via the network access device 124. In some implementation, the vehicle 102 may include a GPS unit instead of the navigation unit 122. In that regard, the ECU 112 may perform the functions of the navigation unit 122 based on data received from the GPS unit. At least one of the navigation unit 122 or the ECU 112 may predict a route set that includes at least two predicted routes. The route set may be predicted based on previously detected data, the current location, the current time of day, the current date, and/or the current day of the week. The navigation unit 122 or the ECU 112 may perform navigation functions. Navigation functions may include, for example, route and route set prediction, providing navigation instructions, and receiving user input such as verification of predicted routes and route sets or destinations.

The navigation unit 122 may include a user interface separate from the user interface 128 and/or may communicate via the user interface 128. The user interface 128 may be a personal device, e.g., a mobile phone, a tablet, a personal computer, that is connected to the ECU 112 through the network access device 124 across a network 106. The user interface 128 may include any device capable of receiving user input, such as a button, a dial, a microphone, or a touch screen, and any device capable of output, such as a display, a speaker, or a refreshable braille display. The user interface 128 allows a driver or a passenger of the vehicle 102 to communicate with the ECU 112. For example, the driver may be able to provide data to the ECU 112 and/or receive feedback from the ECU 112 via the user interface 128.

The network access device 124 may include a communication port or channel, such as one or more of a Wi-Fi unit, a Bluetooth® unit, a radio frequency identification (RFID) tag or reader, or a cellular network unit for accessing a cellular network (such as 3G or 4G). The network access device 124 may transmit data to and receive data from devices and systems not directly connected to the vehicle 102. For example, the ECU 112 may communicate with the external databases 104. Furthermore, the network access device 124 may access the network 106, to which the external databases 104 are connected.

The ECU 112 may predict routes for the vehicle 102 based on one or more factors including detected location data, a current time, a current date, a current day of the week, or previously stored route data in a route history. In a similar aspect, the ECU 112 may also be capable of predicting a route set that includes two or more routes based on the above-listed factors. For example, if the driver drives to work at 8:00 a.m. every weekday and then drives home at 5:00 p.m. every weekday, the ECU 112 may predict that the vehicle 102 is going to travel to the driver's work place at 8:00 a.m. and return to the driver's house at 5:00 p.m. Moreover, if the driver takes the same route to work every weekday the ECU 112 may store the route in an internal database 130.

The internal database 130 coupled to the ECU 112 may store routes taken by a driver in a route history, and may associate different parameters with a route set. Examples of the parameters may include an identity of the driver, time and date information, and the driver's driving patterns. For example, if "John Doe" drives to work at 8:00 a.m. every weekday and takes I-5 North and 55 South to work, the internal database 130 may associate "John Doe," 8:00 A.M. on weekdays," with the route "I-5 North and 55 South." The internal database 130 may provide the stored route information to the ECU 112 for route prediction. Other parameters may include traffic conditions and any other parameters obtained by the sensors 126, the navigation unit 122, the user interface 128, or the network 106.

The ECU 112 coupled to a turbocharger 118 may prepare the vehicle 102 for acceleration by spooling up the turbocharger 118 based on a predicted route set. The ECU 112 may send an electrical signal through an electrical connection to the BMCU 116 to provide electrical energy from the battery 120 to the turbocharger 118.

Figure 2:
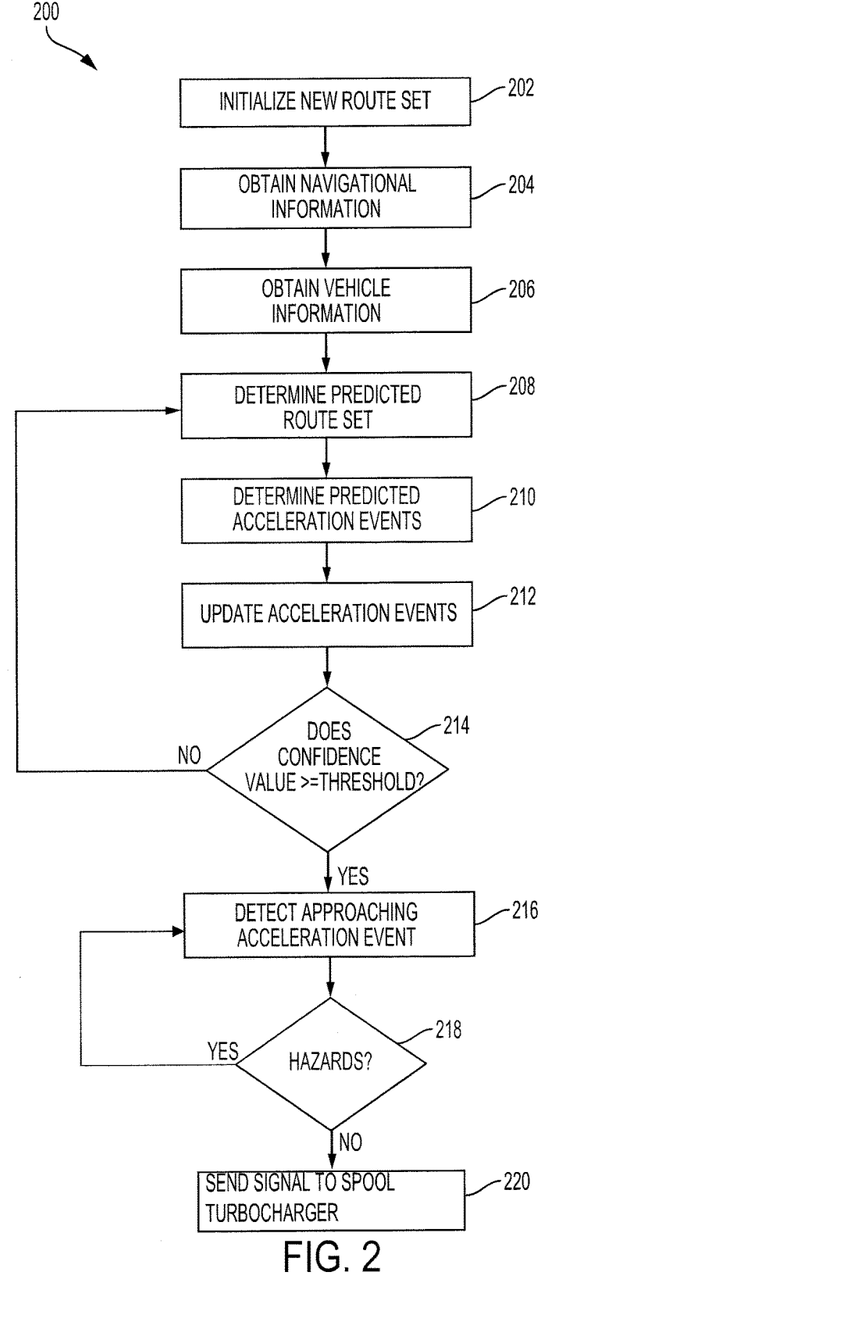
FIG. 2 is a flow diagram of an example process for preparing the vehicle for an approaching acceleration event.

FIG. 2 is a flow diagram of an example process 200 for preparing the vehicle, e.g., the vehicle 102 of FIG. 1, for an approaching acceleration event. One or more computers or one or more data processing apparatuses, for example, the ECU 112 or the navigation unit 122 of the acceleration event prediction system 100 of FIG. 1, appropriately programmed, may implement the process 200.

The system may initialize a new route or route set (202). For example, when the vehicle 102 is powered on, when the vehicle 102 begins initial movement after being powered on, when the user interface 128 of the vehicle is activated or when the navigation unit 122 is activated by a user through the user interface 128, one or more sensors 126 of the system may detect the initialization event. In some implementations, a user interface 128 may receive user input, such as a starting address, that may indicate the beginning of a new route.

The system obtains navigational map information for the vehicle 102 (204). The system may receive the navigational map information from an external database 104, such as from a server of a navigational map provider or an online map service, or from a user interface 128, e.g., a personal mobile device connected through a network 106. The system may extract additional information including terrain and political information from the navigational map information by parsing the data received. The navigational map information may include one or more terrain features and one or more political features. The features may include land features, city and state boundaries, zoning areas, and other information. Each of the features may be associated with map coordinates. Extracted information from the navigational map information may include map coordinates or the map coordinates may be identified by cross-referencing the extracted navigational map information of one database with navigational map information of another database, either internal or external to the vehicle 102.

In some implementations, the system retrieves the navigational map information from a memory device, either internal or external to the vehicle, or uses the network access device 124 to access an external medium or external database 104 to obtain the navigational map information. Other sources that the system may obtain the navigational map information from include user-inputted devices or other computer readable medium, e.g., a flash drive or Universal Serial Bus (USB) memory stick.

In some implementations, the system learns the navigational map information including the terrain and political information by travelling a route set and storing the information including map coordinates for one or more features that are identified while travelling the route set by one or more sensors in a route history.

The system obtains vehicle information of the vehicle 102 (206). The navigation unit 122 may have a Global Positioning Satellite (GPS) device that provides the current location and speed of the vehicle 102, and time and date information including the day of the week. Using the vehicle information and the navigational map information, the system may identify that the current location is John Doe's residence. The system may receive the map coordinates of the vehicle and identify that the location is John Doe's residence by associating the coordinate with public records from an external database, or learned information.

In some implementations, the system may obtain the vehicle information from one or more sensors 126 or an internal clock. For example, the system may obtain the vehicle's speed from a vehicle speed sensor or time from the internal clock. In other implementations the system may obtain the vehicle information from user input, e.g., the system may obtain current time/date information set by a user through a user interface 128. The current time/date may be initialized or pre-set at the factory and may be updated based on user input, the navigational map information, or by connecting to a network 106 through the network access device 124.

The system may determine an identity of the driver, by for example, requesting and/or receiving user input. A user interface 128 may request a driver to login. The login process may include requesting and receiving user identification information, such as a user login and/or password, to identify the driver. Other forms of user input may include the selection of a button, for example, a memory button on the seat that identifies a specific driver of the vehicle, or voice activation. The system may identify the driver through the connection of a personal device, such as a smartphone or a keyfob, to the network access device. In the example above, "John Doe" may enter his vehicle at 8:00 a.m. on a Monday. He may select a memory button on his seat that positions the mirrors and/or seat based on his preference. The system receives a signal that identifies the selection of the memory button. The signal may also identify the driver as "John Doe."

The system may determine a predicted route or route set (208). A route is a path with a starting location and a destination location. The starting location may be the current location of the vehicle or user-inputted. The destination location may be user-inputted or may be determined by the predicted route. A route set is one or more routes. The system may determine the predicted route set based on different parameters. The parameters may include navigational map information, vehicle information, driver behavior patterns, stored information, traffic conditions, road conditions, a route history, or a combination of the different parameters. Driver behavior patterns may include a preference for particular road features, such as highways, curvy roads, or mountainous roads. For example, if "John Doe" is going to work and travels to work taking I-5 North then 55 South every weekday and routinely travels routes using the highway the system may predict that "John Doe" is travelling to work on the same route when he starts the vehicle Monday morning. However, if "John Doe" enters the vehicle on Saturday and sets the golf course as the destination and there is no previous route history the system may select a path that takes the highway to the golf course instead of local roads because "John" frequently uses the highway. The system may create an association among the different parameters and travelled route sets stored in the route history, e.g., "John Doe," "Monday-Friday 8:00 A.M.," "I-5 N and 55 S," to use to determine the predicted route set.

The system may identify a predicted route set based on information obtained from a personal device. In some implementations, the system may communicate with the personal electronic device or the cloud via a network access device. The system may be capable of predicting a route or a route set based on data received from a calendar of the personal device. For example, the calendar may include meetings at work until 6 p.m. and the system may predict that the driver will be at work until 6 p.m. As another example, the calendar may include appointments at various locations throughout the day. The system may predict a route set that includes destinations at the various locations.

The system may adjust or update the route set based on real-time conditions using information received from the network 106. The system may receive traffic condition information from an external database 104 connected to the network 106 or a personal device to identify an alternative route set or update the existing route set.

The system determines one or more predicted acceleration events for the predicted route set based on navigational map information, such as the location of terrain or political features (210). In some implementations, the acceleration events may be based on vehicle information, driver behavior patterns, route history, traffic conditions, road conditions, or a combination of the obtained information. For example, extracted terrain information from the navigational map information may indicate that there is feature, such as a hill or a steep incline along a portion of the route set, and the system may classify a location of one of the features, such as a mountain slope, as a predicted acceleration event. In another example, the system may identify a political feature, such as when the speed limit transitions from 35 mph to 75 mph on a roadway, as a predicted acceleration event. The system may identify or classify a feature as a predicted acceleration event by comparing the feature to a list of predicted acceleration events stored in the memory 114. The list of features, which may be predicted acceleration events, may be customizable by a user through the user interface 128.

In some implementations, the system may identify other political features such as a stop sign, an on-ramp, or other roadway feature, by obtaining that information from an external database 104, web service, or other third-party source and associating the information with a set of map coordinates. In response to identifying the roadway feature, the system may store the location of the roadway feature as an acceleration event, e.g., in an internal database 130.

In some implementations, the system learns the one or more predicted acceleration events by travelling a route set and recording one or more acceleration events while traveling the route set.

The system may update the one or more predicted acceleration events based on one or more restriction parameters (212). The system may, periodically or in real-time, obtain restriction information from the one or more sensors 126 or from the external databases 104. From the restriction information, the system extracts restriction data associated with the one or more restriction parameters and compares the data to a threshold value. The restriction parameters may include traffic conditions, road conditions, user input, or a combination of restriction parameters. The system may remove a particular on ramp that is identified as an acceleration event from the one or more predicted acceleration events based on a congestion rate or on the number of stationary vehicles at the entrance of the on-ramp. For example, the system may obtain restriction information that indicates that I-5 North is at 85% of capacity, and in response, the system may automatically remove the acceleration event located at the I-5 on-ramp from the one or more predicted acceleration events. The threshold amount may be pre-determined or user inputted.

In some implementations, the system removes the acceleration event from the one or more predicted acceleration events if the event is located at, near, or within a construction zone, an accident zone, or a congested traffic area, e.g., an exit of a baseball stadium at or near the time a baseball game is ending.

The system may display the predicted route set and/or the acceleration events on the user interface 128, and may request feedback from the user indicating whether the predicted route set and/or acceleration events are accurate. Either a user confirmation or the vehicle traversing the predicted route validates the accuracy of the predicted route. A route history may track the number of times the route set is predicted and the number of times the predicted route is validated.

The system may determine whether a confidence value for a predicted route set and/or the one or more predicted acceleration events is greater than or equal to a confidence value threshold (214). The confidence value for the predicted route set may be based on a ratio or a comparison of the number of times the route set was identified as a predicted route set and the number of times the predicted route set was validated.

The confidence value for the one or more predicted acceleration events may be based on the route history and may be a ratio or a comparison of the number of times a particular acceleration event was predicted, the number of times the particular acceleration was realized, and the number of times the particular acceleration event was a mis-activation. A realized acceleration event occurs when the system receives an acceleration input at or near the location of the predicted acceleration event. A mis-activation happens when the system sends a signal to spool-up the turbocharger 118 based an approaching acceleration event but no realized acceleration event follows, and may result in a loss of electrical energy and additional noise.

The system may adjust the predicted route and/or predicted acceleration events based on the comparison. If the confidence value is less than the confidence value threshold and the prediction was not validated by the driver, the system may alter the predicted route set and/or acceleration events.

The system detects that the vehicle is approaching an acceleration event based on the vehicle information including the vehicle's current location (216). The vehicle information may be obtained from the navigation unit 122 and updated periodically. The system may compare the vehicle information to the predicted route set and the one or more predicted acceleration events, and may identify an approaching acceleration event by determining that one of the predicted acceleration events is within a threshold distance of the location of the vehicle. In some implementations, the vehicle may identify an approaching acceleration event by calculating the time a vehicle will take to reach the acceleration event using the speed of the vehicle and an estimated distance to the predicted acceleration event. If the time is below a threshold value, the system may identify the predicted acceleration event as an approaching acceleration event. In some implementations, the system identifies an approaching acceleration event by determining that the distance between the location of the vehicle and a predicted acceleration event is decreasing and that the predicted acceleration event is the next acceleration event along the predicted route set.

In some implementations, the system may not determine a predicted route set and/or one or more predicted acceleration events. The system may detect approaching acceleration events in real-time as the vehicle 102 travels from one location to another by cross-referencing the navigational map information and the vehicle information. For example, a driver may select on the user interface 128 to disable route prediction but enable the acceleration event prediction so that as the vehicle 102 approaches a stop sign the system may spool up the turbocharger 118 in preparation for the acceleration event without the vehicle having knowledge of the route travelled.

The system may determine whether there are one or more potential hazards (218). The system may determine whether to enter an acceleration event mode. The acceleration event mode is where the system spools up the turbocharger 118 based on an approaching acceleration event and one or more potential hazards. In some implementations, the acceleration event mode is an activation of a sport mode. The system may identify the one or more potential hazards using one or more sensors 126. For example, if a proximity sensor detects that there is another vehicle in front of or within a threshold distance of the vehicle. The system may enter the acceleration event mode and spool up the turbocharger 118 if the system does not detect a potential hazard, for example, by sending a signal to the turbocharger 118 (220). If the system determines that there is a hazard then the system may not spool the turbocharger 118.

In some implementations, the system may spool the turbocharger 118 based on a manual activation of the acceleration event mode. The system may obtain a signal from a user interface 128 of a selection or a continued depression of a user element that corresponds to the manual activation of the acceleration event mode. For example, a driver may depress a button, e.g., a button on a steering wheel, and hold the button down to spool up the turbocharger 118.

In some implementations, the system may send one or more additional signals that indicate the level of acceleration specific to an approaching acceleration event. The level of acceleration may be based on the specification of the turbocharger 118, the specifications of the engine, or any other acceleration parameter. For example, a signal may indicate that a higher level of acceleration is needed for the approaching acceleration event when the approaching acceleration event is a mountain that has a 25% incline in comparison to accelerating after braking. The one or more additional signals may control the speed of the turbine in the turbocharger 118 and may manage the pressure intake or manifold pressure of the turbocharger 118. Each predicted acceleration events may have a corresponding predicted level of acceleration. A predicted acceleration event may initially have a default level of acceleration that is adjusted as the system learns the desired level of acceleration based on a diver's identify and driving patterns, vehicle information, route history, navigational information, and traffic conditions. The level of acceleration may also be included in information in the route history and stored in the internal database 130.

The system may determine that the acceleration event was realized. The system may determine that the acceleration event was realized by monitoring one or more sensors 126. For example, the system may receive a signal from a pressure sensor that may detect the release of air pressure to the engine or the system may detect an acceleration input from an acceleration input sensor. In another implementation, the system may monitor using the navigation unit or speed sensors and detect an acceleration of the vehicle based on a change in the vehicle's speed.

The system may detect that the vehicle has reached the destination location by comparing the current location of the vehicle to the predicted route set. In response to detecting that the vehicle has reached the destination location, the system may store the route set travelled including the realized acceleration events, an association with the driver's identity, and the driver's driving patterns in a route history. After a predetermined number of trips of a route set, the system may use the route history to determine the predicted route set and/or the acceleration events along the route set.

Figure 3:
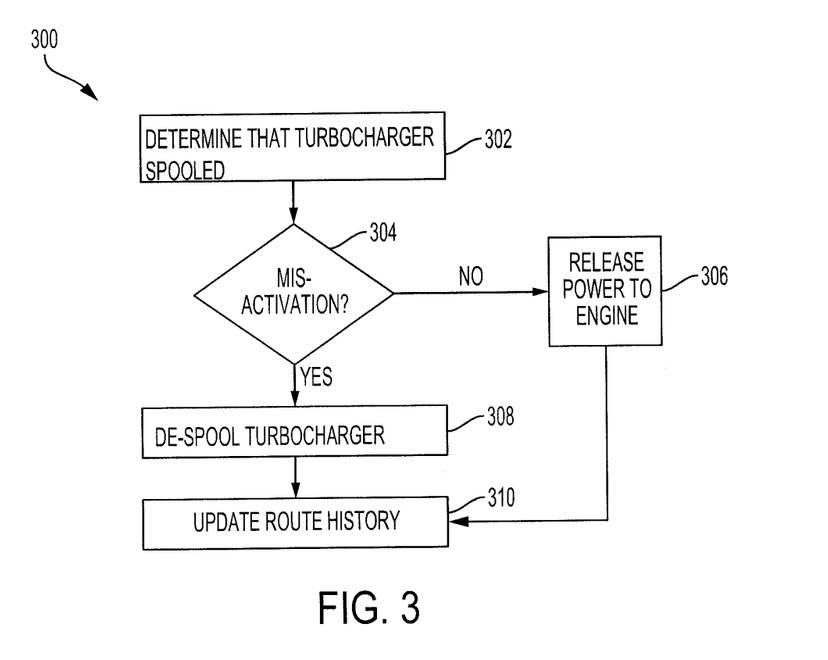
FIG. 3 is a flow diagram of an example process for handling a mis-activated acceleration event.

FIG. 3 is a flow diagram of an example process 300 for handling a mis-activated acceleration event. One or more computers or one or more data processors, for example, the ECU 112 or the navigation unit 122 of the acceleration event prediction system 100 of FIG. 1, appropriately programmed, may implement the process 300.

The system may determine a state of the engine 108 and the turbocharger 118. The system may determine whether the generated power in the turbocharger 118 has been released using one or more sensors 126, e.g., a pressure monitor to measure the pressure within the engine intake. If the pressure within the pressure intake reaches a threshold amount, the system may release the pressure by opening a bypass valve to control the pressure.

The system determines that the turbocharger 118 of the engine 108 is spooled based on the state of the engine 108 and the turbocharger 118 (302). That is, the system did not receive an acceleration input after the system initiated the spool-up of the turbocharger 118. One or more sensors 126 may indicate that there is pressure within the engine intake, which may indicate that the turbocharger 118 is spooled.

After the vehicle 102 reaches the location of the approaching acceleration event, the system may monitor for an acceleration input using an acceleration input sensor. After a threshold amount of time lapses, the system may determine that there is no realized acceleration event if the system does not receive an acceleration input. For example, if a vehicle reaches a waiting zone at an airport, the system may predict an acceleration event in anticipation of the vehicle leaving the waiting zone. However, if the vehicle remains stationary for more than a few minutes, e.g., the passenger being picked up has been delayed, the system may determine that there is no realized acceleration event after 5 minutes.

In some implementations, the system may calculate a distance the vehicle 102 travels away from the location of the acceleration event to determine whether there is a mis-activation. The system may periodically or in real-time obtain the physical location of the vehicle 102 using, e.g., the navigation unit 122 or one of the one or more sensors 126. If the obtained physical location is a threshold distance away from the location of the predicted acceleration event, the threshold distance is increasing, and the system has not received acceleration input, the system may determine that there is no realized acceleration event.

Otherwise, if the system receives an acceleration input, the system releases the generated power in the turbocharger 118 to the engine 108 (306).

In response to determining that the system mis-activated, the system sends or transmits a signal to the turbocharger 118 to spool down the turbocharger 118 (308), and updates the acceleration events for the predicted route set in the route history (310). The updates to the route history may include the number of realized acceleration events, the number of predicted acceleration events, and the number of mis-activations for the particular location of the acceleration event.

Figure 4:
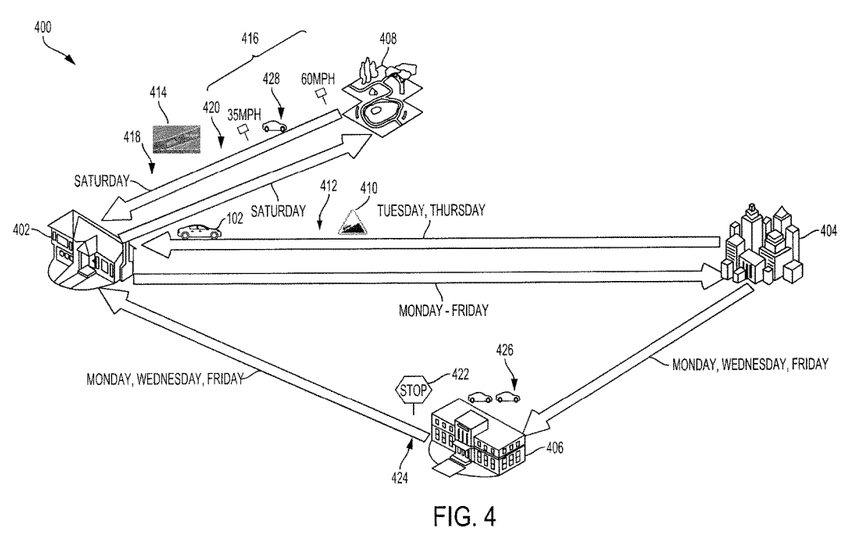
FIG. 4 shows an example map of route sets traveled by the vehicle of FIG. 1.

FIG. 4 shows an example map 400 of route sets traveled by the vehicle 102 of FIG. 1. One or more computers or one or more data processing apparatuses, for example, the ECU 112 or the navigation unit 122 of the acceleration event prediction system 100 of FIG. 1, appropriately programmed, may implement the example route sets.

Map 400 illustrates various routes and route sets traveled by the vehicle 102. As shown, the vehicle 102 travels from a house 402 to a workplace 404 every Monday through Friday by "John Doe." On Tuesdays and Thursdays, the vehicle 102 travels back from the workplace 404 to the house 402. On Mondays, Wednesdays, and Fridays, the vehicle 102 travels from the workplace 404 to a school 406, for example to pick up a child, and then from the school 406 to the house 402. The vehicle 102 may have to wait at the school while the child exits the classroom. On Saturdays, the vehicle 102 may be driven by "Jane Doe" and travels from the house 402 to a park 408 and then from the park 408 to the house 402.

As shown, the first route set is performed on Tuesdays and Thursdays and includes a route from the house 402 to the workplace 404 and a route from the workplace 404 to the house 402. The vehicle 102 is driven by "John Doe" and traverses a hill 410 while travelling from the house 402 to the workplace 404 and back. The system may pre-determine that there is a predicted acceleration event at the location 412 of the bottom of the hill 410 when traveling to work. The system may learn that "John Doe" takes this route every Tuesday and Thursday so when "John Doe" starts the vehicle, the vehicle may identify the first route set including the acceleration event located at the location 412 of the hill 410 as the predicted route.

The second route set occurs on Saturdays and includes a route from the house 402 to the park 408 and a route from the park 408 to the house 402. The system may learn that "Jane Doe" takes this route every Saturday at noon or 12 p.m. The route may include traveling on a highway so that "Jane Doe" has to enter an on-ramp 414 and the speed limit later changes from 35 mph to 60 mph 416. The system may pre-determine that there is a first predicted acceleration event at the location 418 of the on-ramp 414 and a second predicted acceleration event at the location 420 where the speed limit changes from 35 mph to 60 mph. However, as "Jane Doe" approaches the second acceleration event, the vehicle may determine that there is significant traffic 428 surrounding the vehicle using one or more sensors and determine not to prepare for the second predicted acceleration event.

The third route set, on Monday, Wednesday, and Friday, includes three routes. The first route is from the house 402 to the workplace 404, the second route is from the workplace 404 to the school 406 and the third route is from the school 406 to the house 402. The route may include traveling to a school zone and waiting by the school before returning home. The system may identify an acceleration event at the location 424 of the stop sign 422 at the school. In some implementations, the system may determine, after a period of time, that the system mis-activated the acceleration event because the vehicle 102 remained idle at the location 424 past a threshold time. In other implementations, the system may not identify the location 424 as an acceleration event because even though there is a stop sign 422 due to traffic congestion 426 at the school 406 at that particular time, the location 424 is not likely to be an acceleration event.

Figure 5:
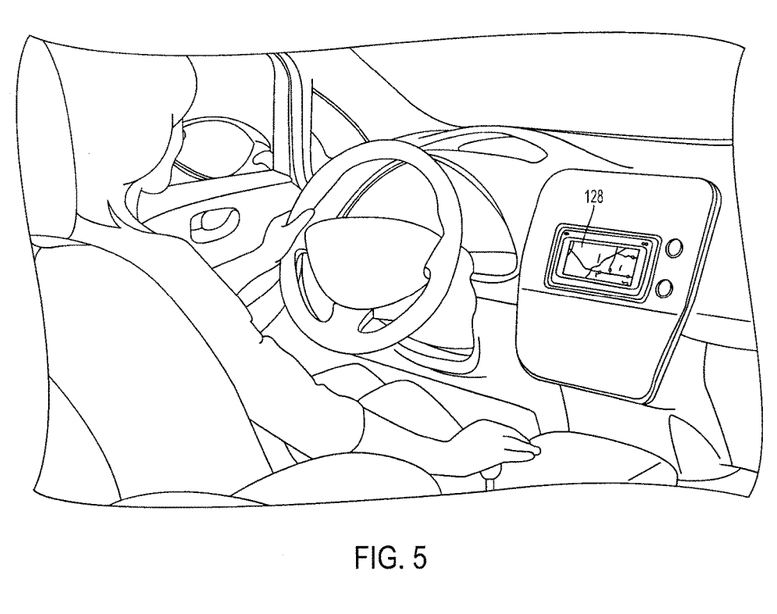
FIG. 5 shows an example interior view of the vehicle of FIG. 1 including a user interface.
Figure 6:
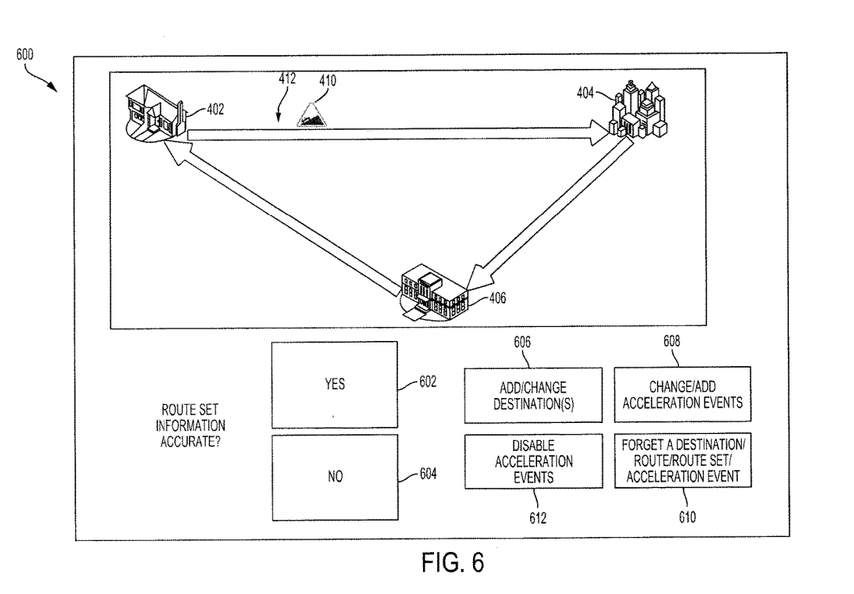
FIG. 6 shows example information provided by the user interface of FIGS. 1 and 5.

FIG. 6 shows example information provided by the user interface 128 of FIGS. 1 and 5. One or more computers or one or more data processing apparatuses, for example, the ECU 112 or the navigation unit 122 of the acceleration event prediction system 100 of FIG. 1, appropriately programmed, may interface with the driver using the user interface 128.

The user interface 128 may output various data and receive various inputs from the driver. For example, as the driver enters the vehicle and turns the vehicle on while at the house 402, the system may predict the route set. Assuming the day is a Monday, a Wednesday or a Friday, the system may predict the third route as shown on the user interface 128.

The system may cause the user interface 128 to output data requesting verification of whether the predicted route set and/or the predicted acceleration events are accurate. The driver may be able to confirm or deny the accuracy of the predicted route using a "yes" button 602 and a "no" button 604.

The user interface 128 may include a button 606 corresponding to an option to add or change destinations. The system may also provide a button 608 corresponding to an option to change or add predicted acceleration events. The system may also provide a button 610 corresponding to an option to forget a destination, a predicted route and/or a route set, or a predicted acceleration event in the route history. The system may provide a button 612 corresponding to an option to disable the acceleration event prediction.

The driver may occasionally decide to take a different route from one place to another, to add a destination to a route set, to take a different trip than usual for a particular day or time, or to disable the acceleration event prediction. In some implementations, the system may have one or more buttons or a touch screen on the user interface to implement the functions of the buttons, e.g., a selection by the user by touching the touch screen at location 412 may disable the acceleration event associated with hill 410.

Figure 7:
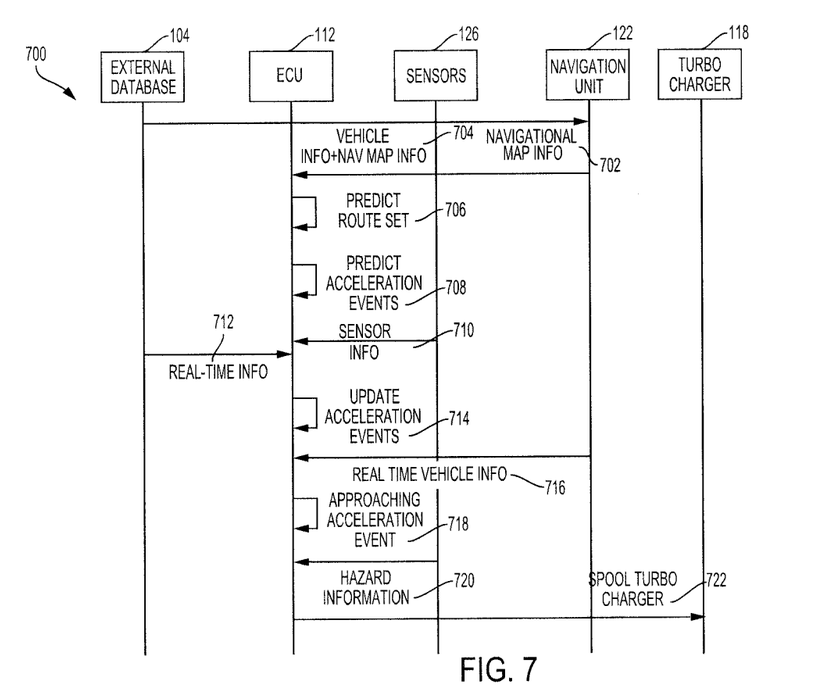
FIG. 7 shows an example sequence of component interactions that perform acceleration event prediction.

FIG. 7 shows an example sequence of component interactions that perform acceleration event prediction. One or more computers or one or more data processing apparatuses, for example, the ECU 112 or the navigation unit 122 of the acceleration event prediction system 100 of FIG. 1, appropriately programmed, may perform the sequence of interactions to perform acceleration event prediction.

One or more external databases 104 send or transmit navigational map information to the navigation unit 122 (702). The navigation unit 122 obtains vehicle information from a GPS device, and then, the navigation unit 122 sends the navigational map information and the vehicle information to the ECU 112 (704). The GPS device may or may not be within the navigational unit 122.

The ECU 112 receives the vehicle information and the navigational map information and predicts a route set (706) using the received information. The ECU 112 may predict the route set using information from a route history stored in an internal database 130. The ECU predicts acceleration events using the vehicle information, navigational map information, route history, or a combination of the above (708).

One or more sensors may send or transmit sensor information including real-time information to the ECU 112 (710). One or more external databases 104 may send or transmit additional real-time or periodically updated information. The real-time information may include traffic or road condition information. The ECU 112 may use the additional information obtained from the sensors 126 and the external databases 104 to update the predicted acceleration events (714).

The navigation unit 122 may, periodically or in real-time, send vehicle information to the ECU 112 (716). The ECU 112 may detect an approaching acceleration event based on the predicted route set, predicted acceleration events, and updated vehicle information (718). In response to detecting an approaching acceleration event, the ECU 112 may obtain, from the one or more sensors 126, hazard information (720). If there is no hazard, the ECU 112 may spool the turbocharger 118 (722).

Although a driver operates the vehicle discussed herein, the systems and methods may be equally applicable to autonomous vehicles. An autonomous vehicle may be provided with one or more destinations or may predict one or more routes. Based on the provided or predicted routes, a system may perform acceleration event prediction described above.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An acceleration event prediction system for a vehicle, comprising:
    an electronic control unit that is coupled to the at least one of the navigation unit or the sensor, the electronic control unit configured to:
        determine a predicted route set that includes one or more paths that the vehicle is predicted to travel,
        determine one or more predicted acceleration events for the predicted route set,
        detect a respective acceleration event of the one or more predicted acceleration events, and
        prepare a turbocharger of the vehicle for the respective acceleration event.

2. The acceleration event prediction system of claim 1, further comprising:
    at least one of a navigation unit or a sensor for obtaining vehicle information,
    wherein the electronic control unit is configured to obtain, from the at least one of the navigation unit or the sensor, the vehicle information, and to determine the predicted route set based on the vehicle information.

3. The acceleration event prediction system of claim 2, wherein the electronic control unit is further configured to:
    receive, from the sensor, sensor information that indicates no hazards are within a threshold distance of the vehicle; and
    wherein preparing the turbocharger is further based on the sensor information.

4. The acceleration event prediction system of claim 2, wherein the electronic control unit is configured to obtain, from the navigation unit, navigational map information, wherein to determine the predicted route set is further based on the navigational map information.

5. The acceleration prediction system of claim 1, wherein the electronic control unit is configured to:
    store, in memory, a route history that includes an identity of a driver, the predicted route set, time and date information, and driving patterns of drivers,
    wherein to determine the predicted route set is based on the route history.

6. The acceleration prediction system of claim 1, wherein to prepare a turbocharger of the vehicle for the respective acceleration event the electronic control unit is configured to spool the turbocharger.

7. The acceleration prediction system of claim 1, wherein to prepare a turbocharger of the vehicle for the respective acceleration event the electronic control unit is configured to send a first signal to spool the turbocharger and send a second signal that indicates a level of acceleration.

8. A method for acceleration event prediction of a vehicle, the method comprising:
    obtaining, from at least one of a navigation unit or a sensor, a first location of the vehicle;
    determining, by an electronic control unit, a predicted route set based on the first location;
    determining, by the electronic control unit, one or more predicted acceleration events for the predicted route set;
    detecting, by the electronic control unit, a respective acceleration event of the one or more predicted acceleration events; and
    preparing, by the electronic control unit, a turbocharger of the vehicle for the respective acceleration event.

9. The method of claim 8, further comprising:
    obtaining, from the at least one of the navigation unit or the sensor, a second location of the vehicle;
    determining, by the electronic control unit, a mis-activation of the turbocharger based on a distance between the second location of the vehicle, the respective acceleration event and a threshold distance; and
    unspool, by the electronic control unit, the turbocharger in response to the mis-activation.

10. The method of claim 8, wherein determining the predicted route set is further based on driving behavior patterns of a driver of the vehicle.

11. The method of claim 8, wherein preparing a turbocharger of the vehicle for the respective acceleration event includes spooling the turbocharger for acceleration.

12. The method of claim 8, further comprising:
    obtaining, from the at least one of the navigation unit or the sensor, navigational map information,
    wherein determining, by the electronic control unit, the one or more predicted acceleration events for the predicted route set is based on the navigational map information.

13. The method of claim 8, wherein determining the one or more predicted acceleration events for the predicted route set comprises:
    determining, by the electronic control unit, that a specific driver is operating the vehicle;
    retrieving, from an internal database, driving patterns associated with the specific driver;
    associating, by the electronic control unit, the driving patterns with the navigational map information and the first location; and
    determining, by the electronic control unit, the one or more predicted acceleration events using the driving patterns, navigational map information and the first location.

14. The method of claim 8, wherein determining the predicted route set is further based information obtained from a personal device.

15. The method of claim 8, further comprising adjusting or updating the predicted route set based on traffic condition information.

16. The method of claim 8, further comprising:
    calculating a confidence value for the predicted route set and the one or more predicted acceleration events based on a route history;
    determining that the confidence value is not greater than a confidence value threshold; and adjusting at least one of the predicted route set or the one or more predicted acceleration events.

17. An acceleration event prediction system for an autonomous vehicle, comprising:
- at least one of a navigation unit or a sensor for obtaining vehicle information; and
- an electronic control unit that is coupled to the at least one of the navigation unit or the sensor, the electronic control unit configured to:
  - obtain, from the at least one of the navigation unit or the sensor, vehicle information,
  - determine a predicted route set based on the vehicle information,
  - determine one or more predicted acceleration events for the predicted route set,
  - detect a respective acceleration event of the one or more predicted acceleration events, and
  - prepare a turbocharger of the vehicle for the respective acceleration event.

18. The acceleration event prediction system of claim 17, wherein to prepare the turbocharger of the vehicle for the respective acceleration event the electronic control unit is configured to spool the turbocharger for the respective acceleration event.

19. The acceleration event prediction system of claim 17, wherein to detect the respective acceleration event of the one or more predicted acceleration events the electronic control unit is configured to:
- compare the vehicle information to the predicted route set and the one or more predicted acceleration events; and
- determine that the respective acceleration event is within a threshold distance of the vehicle.

20. The acceleration event prediction system of claim 17, further comprising:
- receiving user input to prepare the turbocharger;
- detect the respective acceleration event of the one or more predicted acceleration events based on the user input; and
- prepare the turbocharger for the respective acceleration event in response to the detected respective acceleration event.

* * * * *